United States Patent [19]

Hoffman et al.

[11] 4,144,029
[45] Mar. 13, 1979

[54] NICKEL STABILIZERS AND DYE ENHANCERS FOR POLYOLEFINS

[75] Inventors: Joseph A. Hoffman, Bridgewater; Robert J. Tucker, Hackettstown, both of N.J.

[73] Assignee: American Cyanamid Company, Stamford, Conn.

[21] Appl. No.: 820,264

[22] Filed: Jul. 29, 1977

[51] Int. Cl.² .................... C07C 5/02; C07C 65/04; C08K 5/52; C09B 67/00
[52] U.S. Cl. .............................. 8/180; 8/86; 8/90; 8/165; 260/45.7 N; 260/439 R
[58] Field of Search .................... 260/439, 45.75 N; 8/165, 86, 90, 180

[56] References Cited

U.S. PATENT DOCUMENTS

| | | | |
|---|---|---|---|
| 3,039,993 | 6/1962 | Friedman | 260/45.7 PH |
| 3,189,630 | 6/1965 | Smutny | 260/45.75 R |
| 3,464,943 | 9/1969 | Newland et al. | 260/23 H |
| 3,975,358 | 8/1976 | Stretanski | 260/45.75 N |

FOREIGN PATENT DOCUMENTS 44-3242  2/1969  Japan ................................ 8/171

OTHER PUBLICATIONS

CA 67 55101x 1967.

*Primary Examiner*—V. P. Hoke
*Attorney, Agent, or Firm*—Philip T. Mintz; Bruce F. Jacobs

[57] ABSTRACT

Products of the reaction of about 30 to 90 parts by weight of a compound of formula (I)

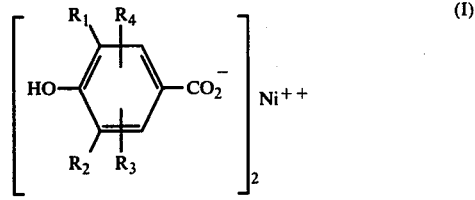

wherein $R_1$ and $R_2$ are each alkyl radicals having up to 8 carbon atoms at least one of which is branched on the alpha carbon, and $R_3$ and $R_4$ are each hydrogen or an alkyl radical having up to 18 carbon atoms, and about 70 to 10 parts by weight, respectively, of a secondary or tertiary phosphite are useful for stabilizing polyolefins against degradation by heat and ultraviolet radiation and for rendering polyolefins dyeable by chelatable dyes such as aromatic ortho hydroxy azo dyes.

20 Claims, No Drawings

NICKEL STABILIZERS AND DYE ENHANCERS FOR POLYOLEFINS

This invention relates to novel nickel stabilizer compositions for polyolefins; their use as heat and ultraviolet radiation stabilizers and dyesites for polyolefins; and to the polymers containing said stabilizers.

The novel nickel stabilizer compositions comprise the products of the reaction of from about 30 to 90 parts by weight of a compound represented by the formula (I):

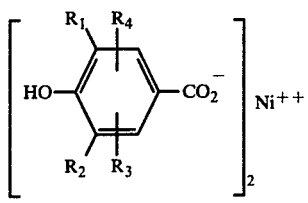

wherein $R_1$ and $R_2$ are each alkyl radicals having up to 8 carbon atoms, at least one of which is branched on the alpha carbon atom and $R_3$ and $R_4$ are each hydrogen or an alkyl radical having up to 18 carbon atoms, and from about 70 to 10 parts by weight of a secondary or tertiary organic phosphite.

Polyolefins, particularly polypropylene, are important as textile fibers because of the economic and physical advantages which they offer. However, the poor dyeability of such fibers has been a problem. One method of improving the dyeability of these materials has been to blend the polyolefin with a nickel compound which can serve as a dyesite for chelatable dyes.

Nickel compounds represented by formula (I) are known to be excellent stabilizers to prevent degradation by ultraviolet radiation and to provide suitable dyesites for chelatable dyes. However, when these compounds are dry blended with a polyolefin and processed at high temperatures (290° C.), they decompose and produce gaseous bubbles in the resulting polyolefin composition. Because of the thermal instability of these compounds, they have not been widely used as ultraviolet stabilizers.

In accordance with the present invention there is provided a nickel stabilizer composition for rendering polyolefins dyeable, and/or resistant to degradation by ultraviolet radiation, comprising a product of the reaction of about 30 to 90 parts by weight, preferably about 50 to 90 parts by weight, of a compound of formula (I) and about 70 to 10 parts by weight, preferably about 50 to 10 parts by weight, respectively, of a secondary or tertiary organic phosphite.

More preferably, the composition comprises a product of the reaction of about 70 to 80 parts by weight of nickel 3,5-di-t-butyl-4-hydroxybenzoate and about 30 to 20 parts by weight of diisodecyl pentaerythrityl disphosphite.

In accordance with the present invention there is also provided a dyeable, and/or ultraviolet radiation resistant polyolefin composition comprising a polyolefin and from about 0.005% to 10%, preferably about 0.33% to 2%, by weight of said nickel stabilizer composition, based on the weight of the polyolefin.

More preferably, the polyolefin composition comprises polypropylene and from about 1% to 2% by weight of the more preferred nickel stabilizer composition, based on the weight of the polyolefin.

The present invention also provides a method for dyeing or printing polyolefin fibers, films or fabrics which comprises incorporating into said polyolefin, preferably polypropylene, from about 0.2% to 10% by weight of a nickel stabilizer composition of this invention based on the weight of the polyolefin; forming fibers, films or fabrics therefrom; and contacting said fibers, films, or fabrics with a chelatable dye, preferably a water-insoluble aromatic monoazo dye having a hydroxy group at one of the positions ortho to the position of the azo group.

The nickel stabilizer compositions of this invention are more uniformly incorporated into polyolefins than a simple mixture of the individual reactants, and decomposition of the compound of formula (I) is thereby essentially eliminated.

The nickel salts of the following acids are illustrative of the compounds of formula (I):

3,5-di-t-butyl-4-hydroxybenzoic acid,
3,5-diisopropyl-4-hydroxybenzoic acid,
3,5-di-s-butyl-4-hydroxybenzoic acid, 3-isopropyl-5-t-butyl-4-hydroxybenzoic acid,
3,5-di-cyclohexyl-4-hydroxybenzoic acid,
3-methyl-5-t-butyl-4-hydroxybenzoic acid,
2,6-dimethyl-3,5-di-t-butyl-4-hydroxybenzoic acid,
2-nonyl-3,5-di-t-butyl-4-hydroxybenzoic acid,
3,5-di-t-amyl-4-hydroxybenzoic acid,
3,5-di-t-octyl-4-hydroxybenzoic acid, and the like.

These salts can be prepared by stirring a dilute solution of the corresponding sodium salt with an aqueous solution containing an equivalent amount of nickel chloride and recovering the precipitated nickel salt by conventional methods.

The above-mentioned sodium salt can be prepared by methods disclosed by Smutny in U.S. Pat. No. 3,189,630, e.g. Example I.

The preferred nickel salt is the nickel salt of 3,5-di-t-butyl-4-hydroxybenzoic acid.

The following phosphites are illustrative of the secondary and tertiary organic phosphites which may be reacted with the compounds of formula (I):

dioctadecyl pentaerythrityl diphosphite,
triisodecyl phosphite,
diisodecyl pentaerythrityl diphosphite,
distearyl pentaerythrityl diphosphite,
distearyl phosphite,
tris(nonylphenyl)phosphite,
trimethyl phosphite,
dioctyl phosphite,
poly (diisopropyleneglycol phenylphosphite),
tris(3-hydroxypropyl)phosphite,
trioctadecyl phosphite,
diphenyl phosphite,
triphenyl phosphite,
diphenylisodecyl phosphite,
tricyclohexyl phosphite, and the like.

The preferred phosphite is diisodecyl pentaerythrityl disphosphite.

The novel reaction products of the present invention can conveniently be prepared by dissolving the nickel salt of formula (I) and the secondary or tertiary phosphite together in an inert solvent, such as toluene, and then evaporating the inert solvent under vacuum until the reaction product is dry.

As used herein, the term "polyolefin" includes alpha-olefin homopolymers such as low density polyethylene, high density polyethylene, polypropylene, polystyrene, polybutadiene, polybutylene, polyisoprene, and the like, and copolymers such as ethylene-propylene copolymer, ethylenebutylene copolymer, ethylene-vinyl acetate copolymer, styrenebutadiene copolymer, acrylonitrile-styrene--butadiene copolymer, and the like. The preferred polyolefin is polypropylene.

The compositions of this invention may be incorporated into polyolefins by any of the various procedures known in the art such as by dry blending the compositions with the polyolefin in powder or granular form, followed by milling, Banbury mixing, molding, casting, extruding, swelling, and the like, to obtain a dyeable polyolefin fiber, film, or fabric.

The amounts of the composition needed to be effective will depend on the effect sought and on the particular composition used.

The thermal stability of the polyolefin composition is determined by cutting the material into strips; inserting the strips into a Melt Index Apparatus (ASTM D1238) at 290° C; and extruding the material after a residence period of 5 or 10 minutes. The extrudate is then inspected for discoloration or gassing, as evidenced by the presence of bubbles.

The discoloration of the extrudate is given a numerical rating, each number above zero indicating a degree of discoloration:

0 = no discoloration
1 = yellow-green
2 = tan-green
3 = slightly gray-tan
4 = brown-green
5 = gray-green
6 = brown
7 = gray
8 = dark brown
9 = black As used herein, the term "no discoloration" is defined as no additional coloration beyond that imparted by the nickel stabilizer composition itself.

The resulting polyolefin composition can be dyed or printed by contacting it in the form of a fiber, film, or fabric with a solution or a dispersion of a chelatable dyestuff in a neutral, acidic or alkaline dyebath, or with a printing paste. Preferably, the dyeing or printing is carried out in an acidic medium at about 50°–130° C., more preferably at about 95°–100° C. At temperatures above 100° C. the dyeing or printing may be carried out in a closed vessel at super-atmospheric pressure.

The print paste used for the printing of chelatable dyes is generally composed of a thickener, carrier, acid for pH control, sequestrant and water in addition to the dye.

The dyebath may also contain an acid, thickener, carrier, or sequestrant in addition to water and the dye.

Suitable acids include citric, tartaric, acetic, and the like. The acid is used to promote the chelation reaction and thereby obtain good wet crocking fastness.

Suitable carriers include trichlorobenzene, esters of aromatic carboxylic acids, diphenyl ether, and the like.

Suitable thickeners include methyl cellulose, carboseed ether, sodium alginate, carboxymethyl cellulose, and the like. The thickener imparts good color value and crocking fastness.

Suitable dispersing agents and emulsifiers include sodium lignosulfonate, the sodium salts of polymeric carboxylic acids, polyoxyethylene alcohols, sodium N-methyl-Noleoyltaurate, and the like.

Suitable sequestrants include ethylenediamine, citric acid, tartaric acid, and the like. The sequestering agents are effective for removing iron and copper salts at pH values below 5.

The chelatable dyes which are useful for dyeing or printing polyolefins containing the reaction products of this invention include aromatic ortho hydroxy azo dyes, such as aromatic ortho hydroxy mono-azo and conjugated di- and multi-azo dyes. These include the Polypropylene series of dyes produced by the National Aniline Division of Allied Chemical Company, such as Polypropylene Green BM and Polypropylene Scarlet RBM.

Polypropylene Green BM is represented by the formula:

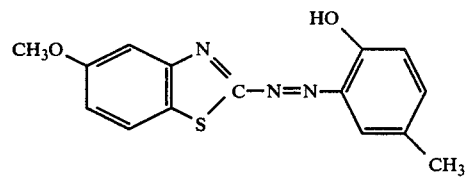

Structural formulas for two other ortho hydroxy azo dyes which may be used are shown below:
Sudan Orange RRA (C.I. Solvent Orange 7)

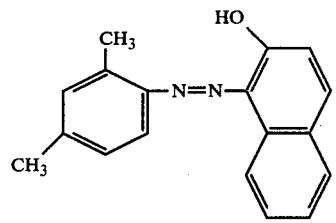

Sudan Red 4BA (C.I. Solvent Red 24)

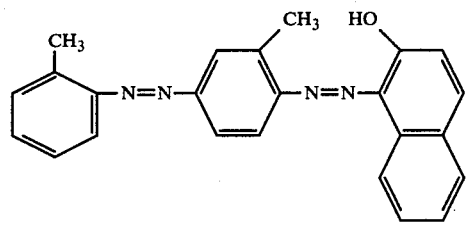

Other suitable azo dyes which may be used include:

| C.I. | Disperse | Yellow | 94 |
|---|---|---|---|
| " | " | " | 95 |
| " | " | " | 96 |
| C.I. | Disperse | Orange | 64 |
| " | " | " | 65 |
| " | " | " | 85 |
| C.I. | Disperse | Red | 144 |
| " | " | " | 173 |
| " | " | " | 174 |
| " | " | " | 175 |
| C.I. | Disperse | Violet | 45 |
| " | " | " | 54 |
| C.I. | Disperse | Blue | 136 |
| " | " | " | 137 |
| " | " | " | 138 |
| C.I. | Disperse | Brown | 8 |

All the above azo dyes are shown in "Colour Index", 3rd Edition, Vol. 2 (1971) as azo dyes used for dyeing nickel modified polypropylene fiber.

Following conventional methods the printing paste containing a suitable dye may be applied to a polyolefin fabric by a printing block, stencil, roller, or spraying device, after which the printed fabric is dried and optionally steamed if desired, at atmospheric or superatmospheric pressures.

Following the dyeing or printing of the polyolefin composition the colored material may be contacted with a hot aqueous soap solution or a solution of a suitable detergent, rinsed with water, and dried.

The following examples illustrate the invention:

EXAMPLE 1

Preparation of Nickel
3,5-Di-t-Butyl-4-Hydroxybenzoate (NBH)

A slurry of 3,5-di-t-butyl-4-hydroxybenzoic acid (60.0 grams; 0.24 mole) in 600 mls of water is agitated while a solution of sodium hydroxide (19.2 grams of 50% real; 0.24 mole) in 100 mls of water is added thereto at about 40° C. After addition of the sodium hydroxide is completed, the yellowish-colored solution is stirred at about 40°-50° C. for about 0.5 hour and an additional 1.0 gram of 3,5-di-t-butyl-4-hydroxybenzoic acid is added thereto to insure that all of the sodium hydroxide is reacted. The solution, still containing some unreacted acid, is stirred for about 15 hours at room temperature, and filtered through a diatomaceous earth to obtain a clear, pale, lemon-yellow solution. The solution is then diluted with water to a final volume of 1600 mls.

The diluted solution is stirred rapidly at about 40° C. while a solution of nickel chloride hexahydrate (28.6 grams; 0.12 mole) in 300 mls of water is added thereto to form a precipitate of the desired product. After the addition is completed, the slurry is stirred at 35° C. for 2 hours and filtered. The filter cake is then washed with water and dried in a vacuum oven to obtain 63 grams (94% of theoretical) of the desired product.

The nickel salts of 3-methyl-5-t-butyl-4-hydroxybenzoic acid; 3,5-di-t-octyl-4-hydroxybenzoic acid; and 2,6-di-methyl-3,5-di-t-butyl-4-hydroxybenzoic acid are prepared in a similar manner by substituting 0.24 mole of the corresponding acid for the 3,5-di-t-butyl-4-hydroxybenzoic acid.

EXAMPLE 2

Product of the Reaction of Nickel
3,5-Di-t-Butyl-4-Hydroxybenzoate and Diisodecyl Pentaerythrityl Diphosphite A green-colored solution is prepared by dissolving 70 parts by weight of the product of Example 1 and 30 parts by weight of diisodecyl pentaerythrityl diphosphite in 600 parts by weight of toluene at room temperature. The solution is then concentrated under vacuum to remove the toluene and obtain a green-colored solid which is subsequently dried in a vacuum oven at 50° C.

Green-colored solids are obtained in a similar manner by substituting 30 parts by weight of triisodecyl phosphite, distearyl phosphite, tris(nonylphenyl)phosphite, trimethyl phosphite, or trioctadecyl phosphite for the diisodecyl pentaerythrityl disphosphite.

Green-colored solids are obtained in a similar manner by substituting 70 parts of the nickel salt of 3-methyl-5-t-butyl-4-hydroxybenzoic acid, 3,5-di-t-octyl-4-hydroxybenzoic acid, or 2,6-dimethyl-3,5-di-t-butyl-4-hydroxybenzoic acid for the product of Example 1.

EXAMPLE 3

Unstabilized polypropylene (100 parts) is dry blended with 0.2 part of a primary-type phenolic-phosphite antioxidant composition (Cyanox®1735 Antioxidant; American Cyanamid Company), 0.1 part of calcium stearate and 1 part of the nickel stabilizer compositions described below. The blended mixture is milled on a standard two-roll mill at about 190° C., cut into strips and inserted into a Melt Index Apparatus at 290° C. and an extrudate is removed after 5 to 10 minutes to inspect the composition for thermal discoloration and gassing, as evidenced by bubbles. Each extrudate is assigned a color rating as described previously. The results obtained are listed in Table I.

TABLE I

| Stabilizer Composition* | Discoloration After 5 Min. | 10 Min. | Gassing After 5 Min. | 10 Min. |
|---|---|---|---|---|
| 100% NBH | 0 | 7 | Bubbling | Bubbling |
| A | 0 | 0 | None | None |
| B | 0 | 0 | " | " |
| C | 0 | 0 | " | " |
| D | 0 | 2 | " | " |

*The stabilizer compositions are the products obtained by reacting 70 parts by weight of NBH with 30 parts by weighr of the indicated phosphite, as in Example 2.
A is the diisodecyl pentaerythrityl diphosphite reaction product.
B is the triisodecyl phosphite reaction product.
C is the distearyl phosphite reaction product.
D is the tris(nonylphenyl) phosphite reaction product.

EXAMPLE 4

The dyeability of the polyolefin composition is determined by compression molding the extrudate into thin films (4–5 mils) after blending, milling and aging 10 minutes at 290° C. as described in Example 3. The films are then cleaned by immersion in an aqueous solution (60° C.) containing 0.5% by weight of isooctyl phenoxy polyethoxy ethanol and rinsed with water. The cleansed films are then immersed for 10 minutes in separate aqueous dye baths (95°-100° C.) containing 0.13% by weight of Polypropylene Green BM or Polypropylene Scarlet RBM; each dye bath also contains 2% by weight of citric acid and 0.01% by weight of a nonylphenol ethylene oxide polymer (Deceresol® Surfactant NI; American Cyanamid Company). The dyeability is then qualitatively assessed by visual inspection of the dyed films relative to films containing [2,2'-thiobis(4-t-octylphenolato)]-nbutylamine nickel II (Cyasorb® UV1084 Light Absorber; American Cyanamid Company), a known chelatable dyesite.

The results obtained with 100% NBH and compositions A–D are reported in Table II.

TABLE II

| Stabilizer Composition | Dyeability With Green BM | Scarlet RBM |
|---|---|---|
| 100% NBH | Very Good | Very Good |
| A | Excellent | Very Good |
| B | Very Good | Very Good |
| C | Excellent | Very Good |
| D | Good | Very Good |
| UV-1084 | Good | Good |

EXAMPLE 5

The procedures of Examples 3 and 4 are followed utilizing 1 part of nickel stabilizer compositions described below having varying amounts of NBH and phosphite. The results obtained are listed in Table III. The results show that less discoloration is obtained with stabilizer compositions of this invention than a simple mixture of the reactants or with 100% NBH.

TABLE III

| Stabilizer Composition* | Discoloration After 5 Min. | Discoloration After 10 Min. | Gassing After 10 Min. | Dyeability With Green BM | Dyeability With Scarlet RBM |
|---|---|---|---|---|---|
| B | 0 | 0 | None | Very Good | Very Good |
| E | 0 | 0 | None | Very Good | Good |
| F | 0 | 0 | None | Fair | Fair |
| G | 2 | 6 | None | Very Good | Very Good |
| 100% NBH | 2 | 6 | Bubbling | Very Good | Very Good |
| 100% TDP | 0 | 0 | None | None | None |
| UV-1084 | 0 | 7 | None | Good | Good |

*The stabilizer compositions B, E and F are the products obtained by reacting 70, 50 and 33 parts by weight of NBH with 30, 50 and 67 parts by weight, respectively, of triisodecyl phosphite (TDP). The stabilizer composition G is a simple mixture of 70 parts by weight of NBH and 30 parts by weight of TDP. (Compare results with B which is reaction product of same compounds in same proportion.)

EXAMPLE 6

The resistance to degradation by ultraviolet radiation of NBH is determined by blending unstabilized polypropylene (100 parts), 0.2 part of 2,4,6-tri-t-butylphenol, 0.1 part of calcium stearate and 1 part of NBH, milling on a standard two-roll mill and compression molding thin films (4–5 mils). The films are then exposed to ultraviolet radiation in an Atlas Xenon Weather-Ometer until the carbonyl content is increased by 0.10% based on the weight of the film. The time in hours to reach this concentration, recognized as the point of embrittlement, is 6300 hours.

In the manner described above substituting 1.43 parts of compositions A–D of Example 3 for the NBH similar results are obtained.

We claim:

1. A nickel stabilizer composition for rendering polyolefins dyeable, and resistant to degradation by heat and ultraviolet radiation, comprising a product of the reaction of about 30 to 90 parts by weight of a compound of formula (I)

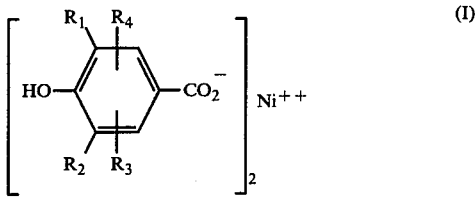
(I)

wherein $R_1$ and $R_2$ are each alkyl radicals having up to 8 carbon atoms at least one of which is branched on the alpha carbon, and $R_3$ and $R_4$ are each hydrogen or an alkyl radical having up to 18 carbon atoms, and about 70 to 10 parts by weight, respectively, of a secondary or tertiary organic phosphite.

2. A composition according to claim 1 comprising a product of the reaction of about 50 to 90 parts by weight of a compound of formula (I) and about 50 to 10 parts by weight, respectively, of said phosphite.

3. A composition according to claim 2 comprising a product of the reaction of about 70 to 80 parts by weight of nickel 3,5-di-t-butyl-4-hydroxybenzoate and about 30 to 20 parts by weight, respectively, of said phosphite.

4. A composition according to claim 3 wherein the phosphite is diisodecyl pentaerythrityl diphosphite.

5. A composition according to claim 1 wherein the phosphite is dioctyl phosphite.

6. A dyeable and heat and ultraviolet radiation resistant composition comprising a polyolefin and from about 0.005 to 10% by weight of a nickel stabilizer composition which is the reaction product of about 30 to 90 parts by weight of

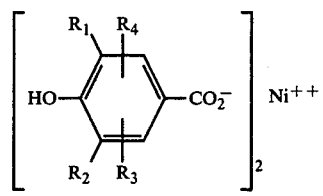

wherein $R_1$ and $R_2$ are each alkyl radicals having up to 8 carbon atoms at least one of which is branched on the alpha carbon, and $R_3$ and $R_4$ are each hydrogen or an alkyl radical having up to 18 carbon atoms, and about 70 to 10 parts by weight, respectively, of a secondary or tertiary organic phosphite, based on the weight of the polyolefin.

7. A composition according to claim 6 containing about 0.33% to 2% by weight of the nickel stabilizer composition based on the weight of the polyolefin.

8. A composition according to claim 7 wherein the polyolefin is polypropylene.

9. A composition according to claim 8 wherein the phosphite is diisodecyl pentaerythrityl diphosphite.

10. A composition according to claim 7 comprising polypropylene and 0.7% to 1.4% by weight of a (composition of claim 3) product of the reaction of about 70 to 80 parts by weight of nickel 3,5-di-t-butyl-4-hydroxybenzoate and about 30 to 20 parts by weight, respectively, of the phosphite, based on the weight of the polypropylene.

11. A composition according to claim 8 wherein the phosphite is dioctyl phosphite.

12. A method for dyeing or printing a polyolefin fiber, film or fabric comprising the steps of:

(a) incorporating into said polyolefin from about 0.2 to 10% by weight of a nickel stabilizer composition which is the reaction product of about 30 to 90 parts by weight of

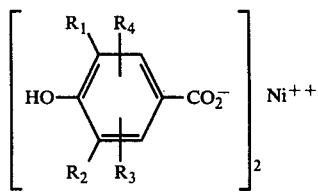

wherein $R_1$ and $R_2$ are each alkyl radicals having up to 8 carbon atoms at least one of which is branched on the alpha carbon, and $R_3$ and $R_4$ are each hydrogen or an alkyl radical having up to 18 carbon atoms, and about 70 to 10 parts by weight, respectively, of a secondary or tertiary organic phosphite, based on the weight of the polyolefin, (b) forming fibers, films, or fabrics therefrom, and (c) contacting said fibers, films or fabrics with a chelatable dye.

13. The method of claim 12 wherein the effective amount of said nickel stabilizer composition is from about 1% to 2% based on the weight of said polyolefin.

14. The method of claim 12 wherein the polyolefin is polypropylene.

15. The method of claim 14 wherein the compound of formula (I) is nickel 3,5-di-t-butyl-4-hydroxybenzoate and the phosphite is diisodecyl pentaerythrityl diphosphite.

16. The method of claim 12 wherein the dye is aromatic ortho hydroxy azo dye.

17. The dyed composition of claim 16.

18. The method of claim 12 wherein the phosphite is dioctyl phosphite.

19. A process for preparing a nickel stabilizer composition which is the reaction product of about 30 to 90 parts by weight of

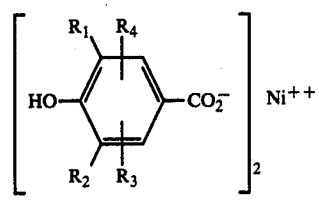

wherein $R_1$ and $R_2$ are each alkyl radicals having up to 8 carbon atoms at least one of which is branched on the slpha carbon, and $R_3$ and $R_4$ are each hydrogen or an alkyl radical having up to 18 carbon atoms, and about 70 to 10 parts by weight, respectively, of a secondary or tertiary organic phosphite, based on the weight of the polyolefin, which comprises: dissolving said compounds together in an inert solvent under vacuum until the composition is dry.

20. A process as defined in claim 19 wherein said inert solvent is toluene.

* * * * *